US008874120B1

(12) United States Patent
Tian et al.

(10) Patent No.: US 8,874,120 B1
(45) Date of Patent: Oct. 28, 2014

(54) AVOIDING FORMATION OF A CALL LOOP RESULTING FROM HANDLING OF A MOBILE TERMINATED CALL IN PARALLEL WITH A LOCATION UPDATE IN A WIRELESS COMMUNICATION NETWORK

(71) Applicants: Lu Tian, Plano, TX (US); Bruno Landais, Pleumeur-Bodou (FR)

(72) Inventors: Lu Tian, Plano, TX (US); Bruno Landais, Pleumeur-Bodou (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/886,195

(22) Filed: May 2, 2013

(51) Int. Cl.
H04W 40/00 (2009.01)
H04W 36/18 (2009.01)
H04W 8/24 (2009.01)
H04W 8/12 (2009.01)
H04M 1/725 (2006.01)

(52) U.S. Cl.
CPC .............. H04W 36/18 (2013.01); H04W 8/12 (2013.01); H04W 8/245 (2013.01); H04M 1/72519 (2013.01)
USPC ......... 455/445; 455/433; 455/550.1; 455/418

(58) Field of Classification Search
CPC ......... H04W 8/245; H04W 8/12; H04W 4/16; H04W 1/72519
USPC ............................... 455/445, 433, 550.1, 418
See application file for complete search history.

(56) References Cited

U.S. PATENT DOCUMENTS

| 6,466,786 | B1 * | 10/2002 | Wallenius | 455/433 |
| 6,693,894 | B1 * | 2/2004 | Andersson et al. | 370/352 |
| 6,839,421 | B2 * | 1/2005 | Ferraro Esparza et al. | 379/220.01 |
| 6,950,876 | B2 * | 9/2005 | Bright et al. | 709/230 |
| 7,522,632 | B2 * | 4/2009 | La Porta et al. | 370/466 |
| 7,783,284 | B1 * | 8/2010 | Laux et al. | 455/418 |
| 8,195,168 | B2 * | 6/2012 | Jansson | 455/445 |
| 8,594,298 | B2 * | 11/2013 | Klein et al. | 379/211.02 |
| 2006/0166699 | A1 * | 7/2006 | Aghvami et al. | 455/552.1 |

OTHER PUBLICATIONS

Third Generation Partnership Project, "3GPP Specification: 23.018, V12.0.0, 3rd Generation Partnership Project; Technical Specification Group Core Network and Terminals; Basic call handling; Technical Realization; Release 12," Mar. 2013.
Third Generation Partnership Project, "3GPP Specification: 23.272, V11.4.0, 3rd Generation Partnership Project; Technical Specification Group Services and System Aspects; Circuit Switched (CS) fallback in Evolved Packet System (EPS), Stage 2, Release 11," Mar. 2013.

* cited by examiner

Primary Examiner — Danh Le
(74) Attorney, Agent, or Firm — Wall & Tong LLP

(57) ABSTRACT

A call loop avoidance capability is provided for preventing formation of a call loop resulting from handling of a mobile terminated (MT) call in parallel with a location update for a mobile device (MD) in a wireless communication network. The call loop avoidance capability prevents formation of a call loop between an old mobility and call management entity (MCME) and a new MCME when delivery of an MT call to an MD is performed while the MD is in the process of moving from the old MCME to the new MCME using a location update procedure. An enhanced call routing procedure supports direct delivery of the MT call from the new MCME to the MD (rather than delivery of the MT call by the new MCME to the MD via the old MCME) in order to prevent formation of a call loop between the old MCME and the new MCME.

24 Claims, 9 Drawing Sheets

MAP PRN MESSAGE 410

| PARAMETER NAME | REQUEST | INDICATION | RESPONSE | CONFIRM |
|---|---|---|---|---|
| INVOKE ID | M | M(=) | M(=) | M(=) |
| IMSI | M | M(=) | | |
| MSC NUMBER | M | M(=) | | |
| MSISDN | U | C(=) | | |
| LMSI | C | C(=) | | |
| GSM BEARER CAPABILITY | C | C(=) | | |
| NETWORK SIGNAL INFO | C | C(=) | | |
| SUPPRESSION OF ANNOUNCEMENT | C | C(=) | | |
| CALL REFERENCE NUMBER | C | C(=) | | |
| GMSC ADDRESS | C | C(=) | | |
| OR INTERROGATION | C | C(=) | | |
| OR NOT SUPPORTED IN GMSC | C | C(=) | | |
| ALERTING PATTERN | C | C(=) | | |
| CCBS CALL | C | C(=) | | |
| SUPPORTED CAMEL PHASES IN INTERROGATING NODE | C | C(=) | | |
| ADDITIONAL SIGNAL INFO | C | C(=) | | |
| PRE-PAGING SUPPORTED | C | C(=) | | |
| LONG FTN SUPPORTED | C | C(=) | | |
| SUPPRESS VT-CSI | C | C(=) | | |
| OFFERED CAMEL 4 CSIS IN INTERROGATING NODE | C | C(=) | | |
| MT ROAMING RETRY SUPPORTED | U | C(=) | | |
| PAGING AREA | U | C(=) | | |
| CALL PRIORITY | U | C(=) | | |
| MTRF INDICATOR | U | C(=) | | |
| OLD MSC NUMBER | U | C (=) | | |
| MTRF OPTIMAL ROUTING SUPPORTED | U | C (=) | | |
| ROAMING NUMBER | | | C | C(=) |
| VMSC ADDRESS | | | U | C(=) |
| RELEASE RESOURCES SUPPORTED | | | U | C(=) |
| MTRF OPTIMAL ROUTING PERFORMED | | | U | C(=) |
| USER ERROR | | | C | C(=) |
| PROVIDER ERROR | | | | O |

411 → MTRF OPTIMAL ROUTING SUPPORTED
412 → MTRF OPTIMAL ROUTING PERFORMED

FIG. 4A

```
PROVIDEROAMINGNUMBERRES ::= SEQUENCE {
    ROAMINGNUMBER              ISDN-ADDRESSSTRING,
    EXTENSIONCONTAINER         EXTENSIONCONTAINER        OPTIONAL,
    ...,
    RELEASERESOURCESSUPPORTED  NULL                      OPTIONAL,
    VMSC-ADDRESS               ISDN-ADDRESSSTRING        OPTIONAL,
    MTRFOPTIMALROUTINGPERFORMED NULL                     OPTIONAL }
-- IF MTRFLOOPAVOIDANCEPROCESSED IS INCLUDED, THE VALUES OF OTHER PARAMETERS
SHALL BE IGNORED.
```

MAP PRN ACK MESSAGE 420

AVOIDING FORMATION OF A CALL LOOP RESULTING FROM HANDLING OF A MOBILE TERMINATED CALL IN PARALLEL WITH A LOCATION UPDATE IN A WIRELESS COMMUNICATION NETWORK

TECHNICAL FIELD

The disclosure relates generally to wireless communication networks and, more specifically but not exclusively, to avoiding formation of a call loop resulting from handling of a mobile terminated call in parallel with a location update in a wireless communication network.

BACKGROUND

Today's wireless telecommunications networks provide telephone subscribers with the ability to access telecommunications services from almost anywhere in the world. One of the keys to facilitating such world-wide access is mobility management. With mobility management, wireless networks are able to track the locations of mobile devices so that mobile services can be delivered to the mobile devices.

A wireless network is typically formed of a number of cells, each covering a small geographic area within which a mobile device, such as a laptop or smartphone, may receive mobile services. A cell is typically equipped with a base station that provides radio coverage to the cell, thereby enabling communication with mobile devices located within the cell. By integrating the coverage of multiple base stations, a wireless network is able to provide radio coverage to mobile stations over large geographic areas. The coverage area of a collection of neighboring base stations is commonly referred to as a location area. A location area is served by a mobile switching center (MSC), and a MSC may serve multiple location areas. The MSC is the network node that provides circuit-switched calling, mobility management, and various other services (e.g., telecommunications services, mobile services, and the like) to mobile subscribers. The MSC maintains subscriber data for the mobile devices that are currently located within the location areas served by the MSC. Mobile subscriber data is permanently maintained in a home location register (HLR) within the wireless network. When a mobile device is within the range of an MSC, the MSC acquires the mobile subscriber data from the HLR and maintains it in a visiting location register (VLR) associated with the MSC. The location area of the mobile station is also maintained in the VLR associated with the MSC, for use by the MSC to page the mobile device in the location area when a mobile termination (MT) call is intended for the mobile device. The MSC that is associated with the current location area of a mobile station may be referred to as a visiting mobile switching center (VMSC) relative to the mobile station. The MSC receiving an MT call that is intended for the mobile subscriber may be referred to as a Gateway MSC (GMSC) for the mobile device. A combination of the MSC and the VLR for the MSC also may be referred to as an MSC/VLR.

When a mobile device moves, the mobile device may move from a current (or old) cell to a new cell, where the old cell and new cell may be part of the same location area or different location areas. The mobile device determines whether it has roamed from an old location area into a new location area by comparing location area identifiers (LAIs) of the old cell and the new cell when the mobile device moves from the old cell to the new cell. When a mobile device moves or "roams" from an old location area into a new location area (e.g., when the mobile device determines that the LAI of the old cell and the LAI of the new cell are different), the mobile device informs the wireless network of the change in location areas by sending a location update request to the wireless network (which requests that a location update procedure be performed). When the new VMSC serving the new location of the mobile device is different than the old VMSC serving the old location of the mobile device, an inter-VLR location update is performed as part of the location update procedure.

During the inter-VLR location update, the new VMSC that receives the location update request from the mobile device transmits an update location message to the HLR of the mobile subscriber. The HLR, in response to receiving the update location message, forwards the subscriber data associated with the mobile subscriber to the new VMSC for temporary storage in the VLR of the new VMSC, updates its own records to indicate that the mobile device is now served by the new VMSC, and sends a message to the old VMSC to request that the old VMSC delete its own subscriber record for this mobile subscriber since the mobile device is no longer being served by the old VMSC. Once the location update procedure is complete, the mobile device stores the new LAI of the new location area and can continue to receive mobile services through the new VMSC of the new location area.

In a typical MT call scenario, an incoming MT call to the mobile device is first routed to the GMSC of the mobile device, e.g., to the GMSC of the Home Public Line Mobile Network (HPLMN) of the mobile device. The GMSC, upon receiving the incoming MT call, queries the HLR of the mobile subscriber to determine the VMSC on which the mobile station is currently registered. The HLR typically obtains routing information from the VMSC and returns it to the GMSC. The GMSC uses the routing information to route the call to the VMSC. The VMSC accesses its subscriber data for the mobile subscriber to determine the location area of the mobile device and pages the mobile device within that location area in order to set up a call connection between the caller and the mobile device of the mobile subscriber. However, if the MT call is received during the time that the mobile device is involved in an inter-VLR location update, the MT call may not be completed to the mobile device. For example, if the HLR has not yet been informed of the change in the VMSC of the mobile device when the GMSC queries the HLR for routing information, the HLR will return the routing information for the old VMSC to the GMSC and, thus, the GMSC will route the MT call to the old VMSC rather than the new VMSC. The old VMSC will then attempt to page the mobile device within the old location area of the old VMSC, however, since the mobile device is no longer in the old location area of the old VMSC, the mobile device will not be able to answer the page. One mechanism for dealing with this situation is Mobile Termination Roaming Retry (MTRR). A more recent mechanism for dealing with this situation, as well as other situations where the mobile device moves from an old MSC to a new MSC, is the Mobile Terminating Roaming Forwarding (MTRF) procedure.

MTRF is a procedure that enables delivery of an MT call to mobile device that moves from an old MSC/VLR to a new MSC/VLR during the delivery of the MT call (e.g., as described in sub-clauses 5.2.3 and 5.2.4 of Third Generation Partnership Project (3GPP) Technical Specification (TS) 23.018). For example, the MTRF procedure may be performed as a result of performing Circuit-Switched Fall Back (CSFB) when the mobile device moves from Long Term Evolution (LTE) coverage to a Global System for Mobile (GSM) EDGE Radio Access Network (GERAN)/Universal Terrestrial Radio Access Network (UTRAN) cell that is served by an MSC/VLR that is different than the MSC/VLR that initiated the SGs paging request (e.g., as described in sub-clause 7.5a of 3GPP TS 23.272). Similarly, for example, as discussed above, the MTRF procedure also may be used in at least some non-CSFB situations. Disadvantageously, however, use of the MTRF procedure to extend an MT call from the old MSC/VLR (the MSC/VLR which served the called mobile device before the delivery of the MT call/paging procedure) toward the new MSC/VLR (the MSC/VLR which serves the called mobile device after the paging procedure is complete) may result in a call loop between the old MSC/VLR and the new MSC/VLR under certain conditions.

SUMMARY OF EMBODIMENTS

Various deficiencies in the prior art may be addressed by embodiments for avoiding formation of a call loop resulting from handling of a mobile terminated call in parallel with a location update in a wireless communication network.

In one embodiment, a method is configured to prevent a call loop for a mobile terminated (MT) call to a mobile device (MD). The method includes receiving, at a first mobility and call management entity (MCME) from a second MCME, a routing information request message associated with delivery of the MT call to the MD, where the routing information request message includes an indication of a gateway MCME for the MD. The method also includes determining, based on the indication of the gateway MCME for the MD, whether a call loop is expected to form between the first MCME and the second MCME during delivery of the MT call to the MD while the MD is moving from the second MCME to the first MCME using a location update procedure.

In one embodiment, a computer-readable storage medium stores instructions which, when executed by a computer, cause the computer to perform a method for preventing a call loop for a mobile terminated (MT) call to a mobile device (MD). The method includes receiving, at a first mobility and call management entity (MCME) from a second MCME, a routing information request message associated with delivery of the MT call to the MD, where the routing information request message includes an indication of a gateway MCME for the MD. The method also includes determining, based on the indication of the gateway MCME for the MD, whether a call loop is expected to form between the first MCME and the second MCME during delivery of the MT call to the MD while the MD is moving from the second MCME to the first MCME using a location update procedure.

In one embodiment, an apparatus is configured to prevent a call loop for a mobile terminated (MT) call to a mobile device (MD). The apparatus includes a processor and a memory communicatively connected to the processor. The processor is configured to receive, from a mobility and call management entity (MCME), a routing information request message associated with delivery of the MT call to the MD, where the routing information request message includes an indication of a gateway MCME for the MD. The processor is configured to determine, based on the indication of the gateway MCME for the MD, whether a call loop is expected to form with the MCME during delivery of the MT call to the MD while the MD is moving from the second MCME to the first MCME using a location update procedure.

BRIEF DESCRIPTION OF THE DRAWINGS

The teachings herein can be readily understood by considering the following detailed description in conjunction with the accompanying drawings, in which:

FIG. 4A depicts an exemplary MAP PRN message including MTRF Optimal Routing Supported and MTRF Optimal Routing Performed Information Elements for use in call loop avoidance;

FIG. 4B depicts an exemplary MAP PRN ACK message including an MTRF Optimal Routing Performed Information Element for use in call loop avoidance;

To facilitate understanding, identical reference numerals have been used, where possible, to designate identical elements that are common to the figures.

DETAILED DESCRIPTION OF EMBODIMENTS

Figure 1:
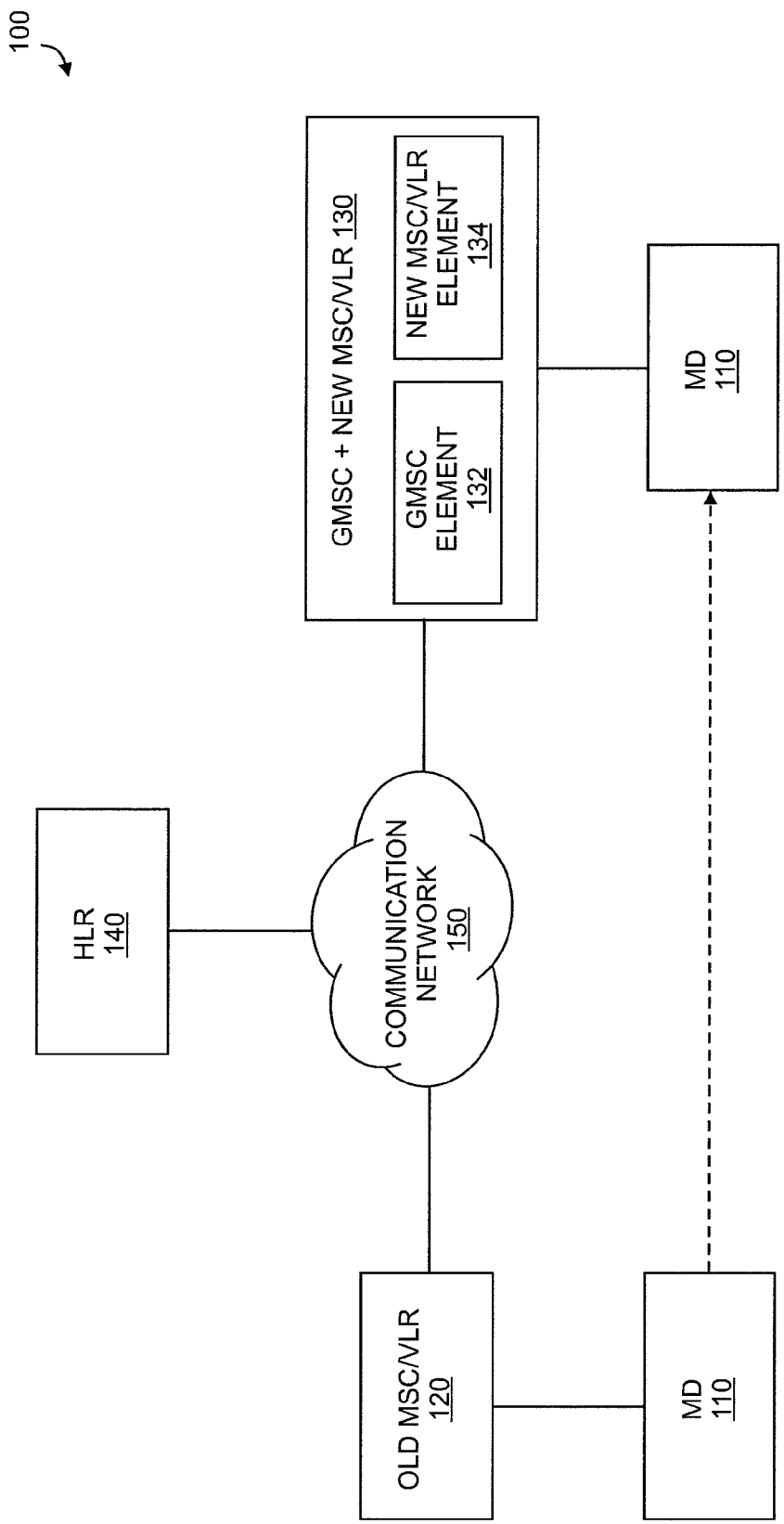
FIG. 1 depicts an exemplary wireless communication system configured for call loop avoidance.

In general, a call loop avoidance capability is presented. In at least some embodiments, the call loop avoidance capability prevents formation of a call loop resulting from handling of a mobile terminated (MT) call in parallel with a location update for a mobile device in a wireless communication network.

In at least some embodiments, the call loop avoidance capability prevents formation of a call loop between a first (or old) mobility/call management entity (e.g., a mobile switching center (MSC)/visiting location register (VLR), a call server, or the like) and a second (or new) mobility/call management entity (e.g., an MSC/VLR, a call server, or the like) when delivery of an MT call to a mobile device is performed while the mobile device is in the process of moving from the first mobility/call management entity to the second mobility/call management entity using a location update procedure. It will be appreciated that a call loop can form between the first mobility/call management entity and the second mobility/call management entity if, during the delivery of the MT call to the mobile device, the mobility/call management entity for the mobile device changes from the first mobility/call management entity to the second mobility/call management entity. It will be appreciated that the mobility/call management entity for the mobile device may change from the first mobility/call management entity to the second mobility/call management entity when the mobile device moves from a first area served by the first mobility/call management entity to a second area served by the second mobility/call management entity. It will be appreciated that the mobility/call management entity for the mobile device may change from the first mobility/call management entity to the second mobility/call management entity when the mobile device reselects different Radio Access Technologies during the delivery of the MT call to the mobile device (e.g., when the mobile device camps over Evolved Universal Terrestrial Radio Access Network (E-UTRAN) during the delivery of the MT call and reselects UTRAN or Global System for Mobile (GSM) EDGE Radio Access Network (GERAN) to proceed with the establishment of the MT call).

In at least some embodiments, the call loop avoidance capability prevents formation of a call loop between a first (or old) mobility/call management entity (e.g., a mobile switching center (MSC) visiting location register (VLR), a call server, or the like) and a second (or new) mobility/call management entity (e.g., an MSC/VLR, a call server, or the like) when the first (or old) mobility/call management entity and the second (or new) mobility/call management entity support use of an enhanced call routing procedure (which also may be referred to as an enhanced version of a call routing procedure). The call routing procedure may be configured to route an MT call from an old mobility/call management entity to a new mobility/call management entity when the mobile is being registered to the new mobility/call management entity from the old mobility/call management entity (e.g., the MTRF procedure or any other suitable call routing procedure that is adapted for routing an MT call). The enhanced call routing procedure may be an enhanced version of the call routing procedure that is configured to prevent formation of a call loop between the old mobility/call management entity and the new mobility/call management entity (e.g., an enhanced version of the MTRF procedure or an enhanced version any other suitable call routing procedure that is adapted for routing an MT call).

Various embodiments of the call loop avoidance capability may be better understood by way of reference to FIG. 1, which depicts an exemplary wireless communication system configured for avoiding call loops associated with handling of mobile terminated calls in parallel with location updates of mobile devices in wireless communication networks.

FIG. 1 depicts an exemplary wireless communication system configured for call loop avoidance. As depicted in FIG. 1, exemplary wireless communication system 100 includes a mobile device (MD) 110, an old MSC/VLR 120, a GMSC+new MSC/VLR 130, a Home Location Register (HLR) 140, and a communication network 150.

The MD 110 may include any suitable type of mobile device which may receive an MT call, such as a cellular phone, a smartphone, a laptop, or the like.

The old MSC/VLR 120 is configured to provide functions typically provided by an MSC and the VLR associated with the MSC. The old MSC/VLR 120 also is configured to provide various functions of the call loop avoidance capability, as depicted and described herein with respect to FIGS. 2-7.

The GMSC+new MSC/VLR 120 includes a GMSC element 132 and a new MSC/VLR element 134. The GMSC element 132 is configured to provide functions typically provided by a GMSC. The new MSC/VLR element 134 is configured to provide functions typically provided by an MSC and the VLR associated with the MSC. The GMSC+new MSC/VLR 120 is configured to provide various functions of the call loop avoidance capability, as depicted and described herein with respect to FIGS. 2-7.

The HLR 140 is configured to provide functions typically provided by an HLR for a wireless network.

The communication network 150 facilitates communication between the old MSC/VLR 120, the GMSC+new MSC/VLR 130, and the HLR 140. The communication network 150 may include any suitable type of communication network.

As depicted in FIG. 1, MD 110 moves from the old MSC/VLR 120 to the GMSC+new MSC/VLR 130. It is assumed that an MT call intended for MD 110 is received while the MD 110 is in the process of moving from the old MSC/VLR 120 to the GMSC+new MSC/VLR 130. The MD 110 may move from the old MSC/VLR 120 to the GMSC+new MSC/VLR 130 for any number of reasons (e.g., when the MTRF procedure is used to support Circuit-Switched Fall Back (CSFB) by the MD 110, when the MTRF procedure is used independent of CSFB, or the like).

Various embodiments of the call loop avoidance capability may be used in order to prevent formation of a call loop between the old MSC/VLR 120 and the GMSC+new MSC/VLR 130 when an MT call intended for MD 110 is received while the MD 110 is in the process of moving from the old MSC/VLR 120 to the GMSC+new MSC/VLR 130.

In at least some embodiments, the call loop avoidance capability may be applied when the MTRF procedure is used in conjunction with completion of an MT call to MD 110. In general, as discussed herein, the MTRF procedure enables delivery of an MT call to a called mobile device (illustratively, MD 110) that moves from an old MSC/VLR (illustratively, old MSC/VLR 120) to a new MSC/VLR (illustratively, GMSC+new MSC/VLR 130) during the delivery of the MT call (e.g., as described in sub-clauses 5.2.3 and 5.2.4 of Third Generation Partnership Project (3GPP) Technical Specification (TS) 23.018). The MTRF procedure may be performed under various scenarios and, thus, various embodiments of the call loop avoidance capability also may be used under various scenarios.

For example, the MTRF procedure may be performed as a result of performing Circuit-Switched Fall Back (CSFB), such as when a called mobile device moves from Long Term Evolution (LTE) coverage to a Global System for Mobile (GSM) EDGE Radio Access Network (GERAN)/Universal Terrestrial Radio Access Network (UTRAN) cell that is served by a new MSC/VLR that is different than the old MSC/VLR that initiated the SGs paging request (e.g., as described in sub-clause 7.5a of 3GPP TS 23.272).

For example, the MTRF procedure may be performed when CSFB is not performed, such as when an incoming MT call is intended for a mobile device while the mobile device is in the process of moving from an old MSC/VLR to a new MSC/VLR and the incoming MT call intended for the mobile device is delivered to the old MSC/VLR before the HLR is updated by the new MSC/VLR (e.g., in a typical roaming situation in which the mobile device is moving and, thus, is passed between MSC/VLRs).

For example, the MTRF procedure may be initiated when MD 110 sends a Location Update message to the GMSC+new MSC/VLR 130 in response to receiving a page from the old MSC/VLR 120 for the MT call to MD 110.

As described herein, the MTRF procedure may be used to extend an MT call from the old MSC/VLR 120 (e.g., the MSC/VLR which served MD 110 before completion of the MT paging/call delivery procedure) to the GMSC+new MSC/VLR 130 (e.g., the MSC/VLR which serves MD 110 after the location update procedure is complete) under various scenarios, however, use of the MTRF procedure to extend an MT call from the old MSC/VLR 120 to the GMSC+new MSC/VLR 130 may result in a call loop between the old MSC/VLR 120 and the GMSC+new MSC/VLR 130 under certain conditions. An exemplary embodiment of a call flow in which call loop avoidance is not supported is presented with respect to FIG. 2. In at least some embodiments, a call loop between the old MSC/VLR 120 and the GMSC+new MSC/VLR 130 when the GMSC+new MSC/VLR 130 is also the GMSC of the MD 110 may be avoided by configuring the GMSC+new MSC/VLR 130 to (1) determine whether the GMSC address received by the GMSC+new MSC/VLR 130 from the old MSC/VLR 120 is identical to the GMSC address of the GMSC of the GMSC+new MSC/VLR 130 and (2) based on a determination that the GMSC address received from the old MSC/VLR 120 is identical to the GMSC address of the GMSC of the GMSC+new MSC/VLR 130, send a release message from the GMSC+new MSC/VLR 130 to the old MSC/VLR 120 and deliver the MT call to the MD 110 directly from the GMSC+new MSC/VLR 130 (rather than by the GMSC+new MSC/VLR 130 via the old MSC/VLR 120). An exemplary embodiment of a call flow in which call loop avoidance is supported is presented with respect to FIGS. 3-5.

Figure 2:
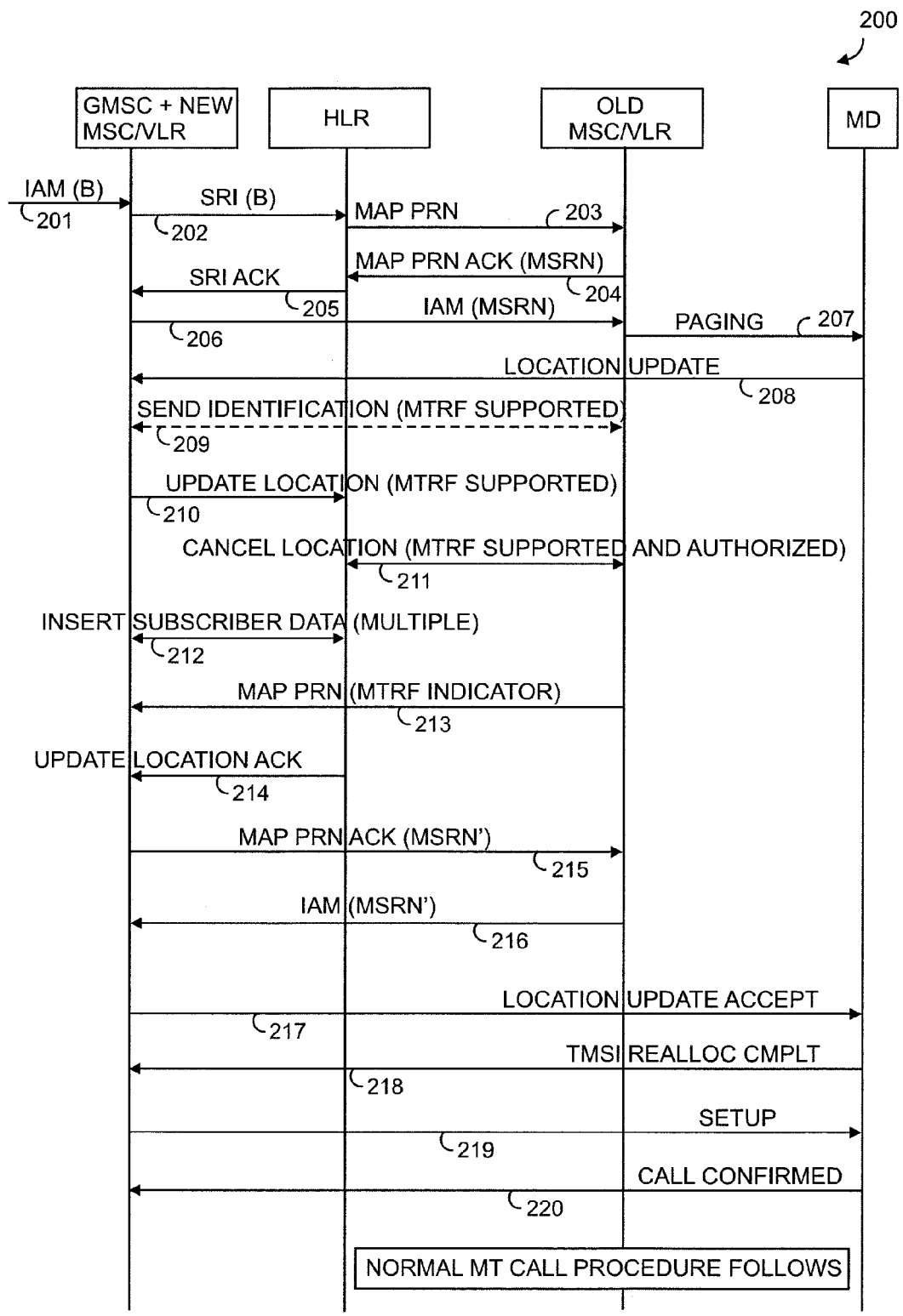
FIG. 2 depicts an exemplary embodiment of a call flow in which call loop avoidance is not supported.

FIG. 2 depicts an exemplary embodiment of a call flow in which call loop avoidance is not supported. It will be appreciated that, although primarily depicted and described as being performed serially, at least a portion of the steps of method 200 may be performed contemporaneously or in a different order than depicted in FIG. 2.

At step 201, the GMSC+new MSC/VLR 130 receives an Initial Address Message (IAM). The IAM includes the called party number of MD 110 (denoted in FIG. 2 as "B"), such as the Mobile Station International Subscriber Directory Number (MSISDN) of MD 110.

At step 202, the GMSC+new MSC/VLR 130 sends a MAP Send Routing Information (SRI) message to the HLR 140 in response to the IAM message. The MAP SRI message includes the called party number of MD 110 (e.g., the MSISDN of the MD 110).

At step 203, the HLR 140 sends a Mobile Application Part (MAP) Provide Roaming Number (PRN) message to the old MSC/VLR 120 in response to the MAP SRI message. The MAP PRN message includes International Mobile Subscriber Identity (IMSI) number of the called party of the MD 110.

At step 204, the old MSC/VLR 120 replies to the MAP PRN message by sending a MAP PRN ACK message to the HLR 140. The MAP PRN ACK message includes the Mobile Station Roaming Number (MSRN) for the MD 110 (which enables routing of the MT call toward the old MSC/VLR 120 at step 206, as discussed below).

At step 205, the HLR 140 replies to the MAP SRI message with a MAP SRI ACK message. The MAP SRI ACK message includes the MSRN for the MD 110.

At step 206, the GMSC+new MSC/VLR 130 sends an IAM message to the old MSC/VLR 120. The IAM message includes the MSRN of the MD 110 which is determined by the GMSC+new MSC/VLR 130 from the MAP SRI ACK message.

At step 207, the old MSC/VLR 120 attempts to page the MD 110.

At step 208, the MD 110 initiates a location update procedure and sends an associated Location Update message to the GMSC+new MSC/VLR 130.

At step 209, the GMSC+new MSC/VLR 130 and the old MSC/VLR 120 exchange Send Identification messages in which the new MSC/VLR 130 notifies the old MSC/VLR 120 that the new MSC/VLR 130 supports the MTRF procedure. The GMSC+new MSC/VLR 130 sends a Send Identification message to the old MSC/VLR 120, where the Send Identification message includes an indication that the GMSC+new MSC/VLR 130 supports the MTRF procedure. The old MSC/VLR 120 replies to the Send Identification message by sending a Send Identification ACK message to the GMSC+new MSC/VLR 130.

At step 210, the GMSC+new MSC/VLR 130 sends an Update Location message to the HLR 140. The Update Location message includes an MTRF flag set in a manner for indicating that the MTRF procedure is supported by the GMSC+new MSC/VLR 130.

At step 211, the HLR 140 and the old MSC/VLR exchange Cancel Location messages. The HLR 140 sends a Cancel Location message to the old MSC/VLR 120, where the Cancel Location message includes an MTRF flag set in a manner for indicating that the MTRF procedure is supported and authorized for the old MSC/VLR 120. The old MSC/VLR 120 replies to the Cancel Location message by sending a Cancel Location ACK message to the HLR 140.

At step 212, the GMSC+new MSC/VLR 130 and the HLR 140 exchange one or more sets of Insert Subscriber Data messages for enabling the HLR 140 to download subscriber information associated with the MD 110 to the GMSC+new MSC/VLR 130. The HLR 140 sends an Insert Subscriber Data message to the GMSC+new MSC/VLR 130, where the Insert Subscriber Data message includes provisioned subscriber data associated with the MD 110. The GMSC+new MSC/VLR 130 replies to the Insert Subscriber Data message by sending an Insert Subscriber Data ACK message to the HLR 140.

At step 213, the old MSC/VLR 120 sends a MAP PRN message to the GMSC+new MSC/VLR 130. The MAP PRN message includes an MTRF flag set in a manner for indicating that the MTRF procedure is supported by the old MSC/VLR 120.

At step 214, the HLR 140 sends an Update Location ACK message to the GMSC+new MSC/VLR 130.

At step 215, the GMSC+new MSC/VLR 130 responds to the MAP PRN message by sending a MAP PRN ACK message to the old MSC/VLR 120. The MAP PRN ACK message includes a MSRN' (which enables extension of the MT call from the old MSC/VLR 120 to the GMSC+new MSC/VLR 130 at step 216, as discussed below).

At step 216, the old MSC/VLR 120 sends an IAM message to the GMSC+new MSC/VLR 130. The IAM message includes the MSRN' received in the MAP PRN ACK message.

At step 217, the GMSC+new MSC/VLR 130 sends a Location Update Accept message to the MD 110.

At step 218, the MD 110 sends a TMSI Reallocation Complete message to the GMSC+new MSC/VLR 130 in response to the Location Update Accept message received from the GMSC+new MSC/VLR 130.

At step 219, the GMSC+new MSC/VLR 130 sends a Setup message to the MD 110.

At step 220, the MD 110 sends a Call Confirmed message to the GMSC+new MSC/VLR 130 in response to the Setup message received from the GMSC+new MSC/VLR 130.

As depicted in FIG. 2, the normal MT call procedure follows after step 220. The normal MT call procedure will be understood by one skilled in the art.

As described herein, in the absence of call loop avoidance, a call loop may form between the GMSC+new MSC/VLR 130 and the old MSC/VLR 120. From FIG. 2, it will be appreciated that the messages sent in step 206 and step 216 constitute a call loop between the GMSC+new MSC/VLR 130 and the old MSC/VLR 120. As described herein, in at least some embodiments this type of call loop may be avoided. An exemplary embodiment of a call flow in which call loop avoidance is supported is presented in FIG. 3.

Figure 3:
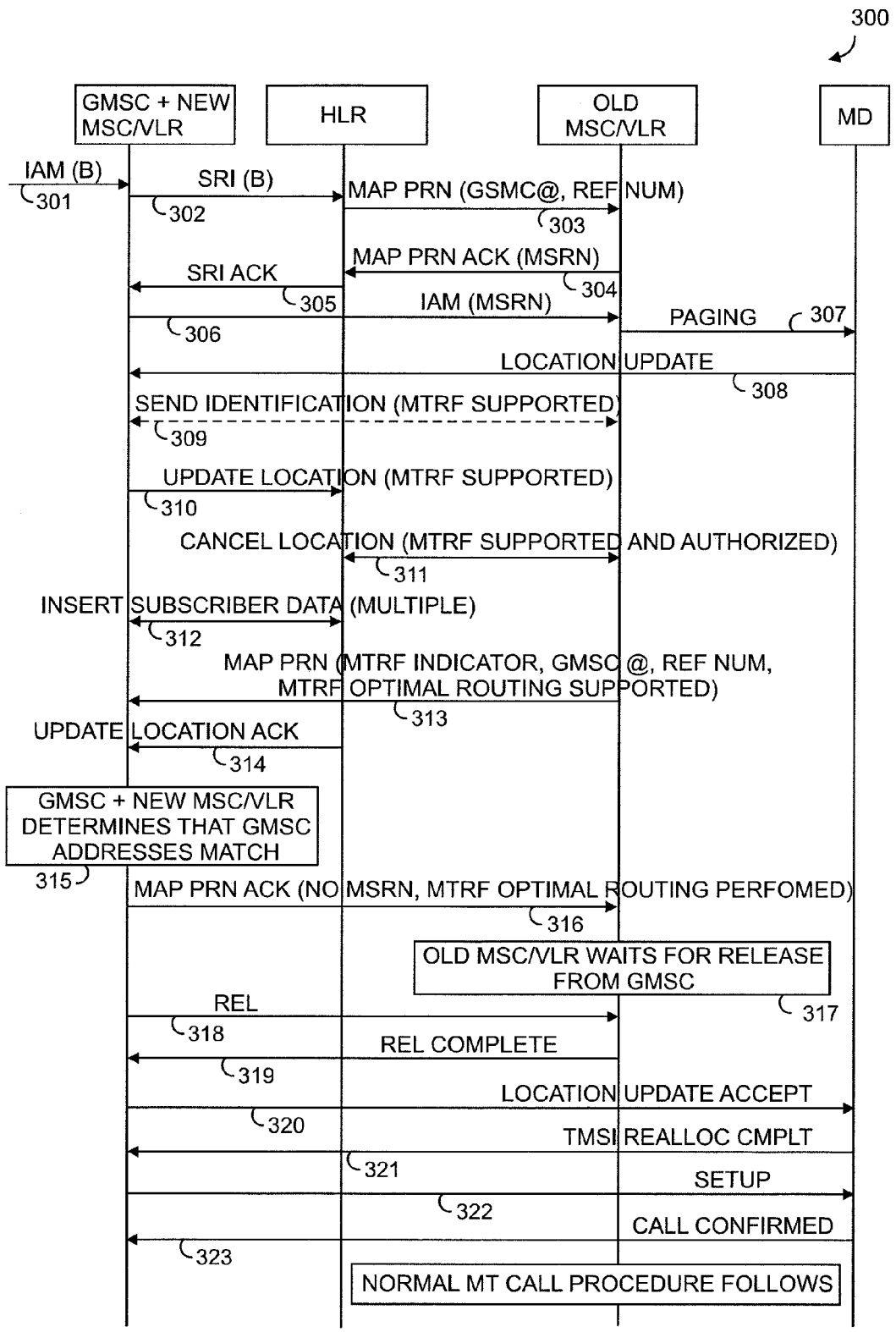
FIG. 3 depicts an exemplary embodiment of a call flow in which call loop avoidance is supported.

FIG. 3 depicts an exemplary embodiment of a call flow in which call loop avoidance is supported. It will be appreciated that, although primarily depicted and described as being performed serially, at least a portion of the steps of method 300 may be performed contemporaneously or in a different order than depicted in FIG. 3.

At step 301, the GMSC+new MSC/VLR 130 receives an Initial Address Message (IAM). The IAM includes the called party number of MD 110 (denoted in FIG. 3 as "B"), such as the Mobile Station International Subscriber Directory Number (MSISDN) of MD 110.

At step 302, the GMSC+new MSC/VLR 130 sends a MAP Send Routing Information (SRI) message to the HLR 140 in response to the IAM message. The MAP SRI message includes the called party number of MD 110 (again, denoted as "B"), an address of the GMSC for the MD 110 (denoted as GMSC@, and a call reference number (denoted as Ref Num).

At step 303, the HLR 140 sends a Mobile Application Part (MAP) Provide Roaming Number (PRN) message to the old MSC/VLR 120 in response to the MAP SRI message. The MAP PRN message includes the address of the GMSC for the MD 110 (denoted as GMSC@) and a call reference number (denoted as Ref Num), both of which are received in the MAP SRI message.

At step 304, the old MSC/VLR 120 replies to the MAP PRN message by sending a MAP PRN ACK message to the HLR 140. The MAP PRN ACK message includes the Mobile Station Roaming Number (MSRN) for the MD 110.

At step 305, the HLR 140 replies to the MAP SRI message with a MAP SRI ACK message. The MAP SRI ACK message includes the Mobile Station Roaming Number (MSRN) for the MD 110.

At step 306, the GMSC+new MSC/VLR 130 sends an IAM message to the old MSC/VLR 120. The IAM message includes the MSRN of the MD 110 which is determined by the GMSC+new MSC/VLR 130 from the MAP SRI ACK message.

At step 307, the old MSC/VLR 120 attempts to page the MD 110.

At step 308, the MD 110 initiates a location update procedure and sends an associated Location Update message to the GMSC+new MSC/VLR 130.

At step 309, the GMSC+new MSC/VLR 130 and the old MSC/VLR 120 exchange Send Identification messages in which the GMSC+new MSC/VLR 130 notifies the old MSC/VLR 120 that the GMSC+new MSC/VLR 130 supports the MTRF procedure. The GMSC+new MSC/VLR 130 sends a Send Identification message to the old MSC/VLR 120, where the Send Identification message includes an indication that the GMSC+new MSC/VLR 130 supports the MTRF procedure. The old MSC/VLR 120 replies to the Send Identification message by sending a Send Identification ACK message to the GMSC+new MSC/VLR 130.

At step 310, the GMSC+new MSC/VLR 130 sends an Update Location message to the HLR 140. The Update Location message includes an MTRF flag set in a manner for indicating that the MTRF procedure is supported (denoted as MTRF Supported).

At step 311, the HLR 140 and the old MSC/VLR exchange Cancel Location messages. The HLR 140 sends a Cancel Location message to the old MSC/VLR 120, where the Cancel Location message includes an MTRF flag set in a manner for indicating that the MTRF procedure is supported and authorized (denoted as MTRF Supported And Authorized). The old MSC/VLR 120 replies to the Cancel Location message by sending a Cancel Location ACK message to the HLR 140.

At step 312, the GMSC+new MSC/VLR 130 and the HLR 140 exchange one or more sets of Insert Subscriber Data messages for enabling HLR 140 to download subscriber information associated with the MD 110 to the GMSC+new MSC/VLR 130. The HLR 140 sends an Insert Subscriber Data message to the GMSC+new MSC/VLR 130, where the Insert Subscriber Data message includes provisioned subscriber data associated with the MD 110. The GMSC+new MSC/VLR 130 replies to the Insert Subscriber Data message by sending an Insert Subscriber Data ACK message to the HLR 140.

At step 313, the old MSC/VLR 120 sends a MAP PRN message to the GMSC+new MSC/VLR 130. The MAP PRN message includes an MTRF flag set in a manner for indicating that the MTRF procedure is supported (denoted as MTRF Indicator), the address of the GMSC determined from the MAP PRN message received from the HLR 140 (denoted as GMSC@), the Call Reference Number determined from the MAP PRN message received from the HLR 140 (denoted as Ref Num), and an indication from the old MSC/VLR 120 to the GMSC+new MSC/VLR 130 that the old MSC/VLR 120 supports MTRF optimal routing (e.g., an enhanced version of the MTRF procedure which is configured to prevent formation of a call loop between the old MSC/VLR 120 and the GMSC+new MSC/VLR 130). The indication from the old MSC/VLR 120 to the GMSC+new MSC/VLR 130 that the old MSC/VLR 120 supports MTRF optimal routing may be provided, as an example, in the form of an MTRF Optimal Routing Supported Information Element (denoted as MTRF Optimal Routing Supported) included within the MAP PRN message. An exemplary MAP PRN message including MTRF Optimal Routing Supported and MTRF Optimal Routing Performed Information Elements for use in call loop avoidance is presented in FIG. 4A. As depicted in FIG. 4A, exemplary MAP PRN message 410 includes a set of parameters having information defined in one or more of the following columns: Request, Indication, Response, and Confirm. The MTRF Optimal Routing Supported Information Element 411 is defined as having a Request value of "U" and an Indication value of "(C=)". The MTRF Optimal Routing Performed Information Element 412 is defined as having a Response value of "C" and a Confirm value of "(C=)". It will be appreciated that the MTRF Optimal Routing Supported Information Element 411 or the MTRF Optimal Routing Performed Information Element 412 may be defined in any other suitable manner, may be arranged with respect to other parameters of the MAP PRN message 410 in any suitable manner, or the like, as well as various combinations thereof. It will be appreciated that MAP PRN message 410 may include fewer or more parameters, parameters defined in other ways, different parameters, different arrangements of parameters with respect to each other, or the like, as well as various combinations thereof. It will be appreciated that references herein to MTRF optimal routing also may be read as references to MTRF enhanced routing in that the normal MTRF procedure is enhanced to prevent formation of a call loop between the old MSC/VLR 120 and the GMSC+new MSC/VLR 130 and, thus, that the MTRF Optimal Routing Supported Information Element 411 and the MTRF Optimal Routing Performed Information Element 412 also may be referred to as an MTRF Enhanced Routing Supported Information Element and an MTRF Enhanced Routing Performed Information Element (or using any other suitable designators), respectively.

At step 314, the HLR 140 sends an Update Location ACK message to the GMSC+new MSC/VLR 130.

At step 315, the GMSC+new MSC/VLR 130 determines that the GMSC address received in the MAP PRN message from the old MSC/VLR 120 is the same as the GMSC address of the GMSC of the GMSC+new MSC/VLR 130 (i.e., that the GMSC address received in the MAP PRN message from the old MSC/VLR 120 is its own address). The GMSC+new MSC/VLR 130, based on a determination that the GMSC address received in the MAP PRN message is the same as the GMSC address of the GMSC of the GMSC+new MSC/VLR 130, performs the following: (1) sends a MAP PRN ACK message, including an MTRF Optimal Routing Performed Information Element, to the old MSC/VLR 120 (as discussed in additional detail with respect to step 316) and (2) sends a Release message to the old MSC/VLR 120 (as discussed in additional detail with respect to step 318).

At step 316, the GMSC+new MSC/VLR 130 responds to the MAP PRN message by sending a MAP PRN ACK message to the old MSC/VLR 120. The MAP PRN ACK message also may be referred to herein as a MAP PRN response message.

The MAP PRN ACK message includes an indication from the GMSC+new MSC/VLR 130 to the old MSC/VLR 120 that the GMSC+new MSC/VLR 130 has performed (or at least accepted) MTRF optimal routing (e.g., an enhanced version of the MTRF procedure which is configured to prevent formation of a call loop between the old MSC/VLR 120 and the GMSC+new MSC/VLR 130). The indication that the GMSC+new MSC/VLR 130 has performed (or at least accepted) MTRF optimal routing may be provided, as an example, in the form of an MTRF Optimal, outing Performed Information Element (denoted as MTRF Optimal Routing Performed) included within the MAP PRN ACK message. An exemplary MAP PRN ACK message including an MTRF Optimal Routing Performed Information Element for use in call loop avoidance is presented in FIG. 4B. As depicted in FIG. 4B, exemplary MAP PRN ACK message 420 includes a set of parameters including an mtrfOptimalRoutingPerformed Information Element 421 set to include values of NULL and OPTIONAL. As depicted in FIG. 4B, if the exemplary MAP PRN ACK message 420 includes an mtrfLoopAvoidanceProcessed Information Element, the values of some or all of the other parameters of the MAP PRN ACK message 420 may be ignored by the old MSC/VLR 120. It will be appreciated that the MTRF Optimal Routing Performed Information Element 421 may be defined in any other suitable manner, may be arranged with respect to other parameters of the MAP PRN ACK message 420 in any suitable manner, or the like, as well as various combinations thereof. It will be appreciated that MAP PRN ACK message 420 may include fewer or more parameters, parameters defined in other ways, different parameters, different arrangements of parameters with respect to each other, or the like, as well as various combinations thereof. Again, it will be appreciated that referenced herein to MTRF optimal routing also may be read as references to MTRF enhanced routing in that the normal MTRF procedure is enhanced to prevent formation of a call loop between the old MSC/VLR 120 and the GMSC+new MSC/VLR 130 and, thus, that the mtrfOptimalRoutingPerformed Information Element 421 also may be referred to as an mtrfEnhancedRoutingPerformed Information Element (or using any other suitable designator).

The MAP PRN ACK message may or may not include an MSRN. In at least some embodiments, the GMSC+new MSC/VLR 130 does not need to include an MSRN in the MAP PRN ACK message if the MAP PRN ACK message includes an indication from the GMSC+new MSC/VLR 130 to the old MSC/VLR 120 that the GMSC+new MSC/VLR 130 has accepted or performed MTRF optimal routing. It is noted that, if the MAP PRN ACK message includes an MSRN and the MTRF Optimal Routing Performed Information Element, the old MSC/VLR 120 ignores the MSRN based on a determination that the MAP PRN ACK message includes the indication from the GMSC+new MSC/VLR 130 to the old MSC/VLR 120 that the GMSC+new MSC/VLR 130 has performed (or at least accepted) MTRF optimal routing (e.g., an MTRF Optimal Routing Performed Information Element).

At step 317, the old MSC/VLR 120 waits for release from the GMSC of the GMSC+new MSC/VLR 130. The old MSC/VLR 120 enters a waiting mode such that the Release message expected from the GMSC+new MSC/VLR 130 is received.

At step 318, the GMSC+new MSC/VLR 130 sends a Release message to the old MSC/VLR 120. The old MSC/VLR 120 releases its resources for the MD 110 in response to the Release message.

At step 319, the old MSC/VLR 120 sends a Release Complete message to the GMSC+new MSC/VLR 130.

At step 320, the GMSC+new MSC/VLR 130 sends a Location Update Accept message to the MD 110.

At step 321, the MD 110 sends a TMSI Reallocation Complete message to the GMSC+new MSC/VLR 130 in response to the Location Update Accept message received from the GMSC+new MSC/VLR 130.

At step 322, the GMSC+new MSC/VLR 130 sends a Setup message to the MD 110.

At step 323, the MD 110 sends a Call Confirmed message to the GMSC+new MSC/VLR 130 in response to the Setup message received from the GMSC+new MSC/VLR 130.

As depicted in FIG. 3, the normal MT call procedure follows after step 323. The normal MT call procedure will be understood by one skilled in the art.

As described herein, the GMSC+new MSC/VLR 130 includes a GMSC element 132 and a new MSC/VLR element 134. Thus, functions presented herein as being performed by the GMSC+new MSC/VLR 130 may be performed by GMSC element 132, new MSC/VLR element 134, or a combination of GMSC element 132 and new MSC/VLR element 134. Accordingly, various implementations of the GMSC+new MSC/VLR 130, in terms of distribution of functions of the GMSC+new MSC/VLR 130 across the GMSC element 132 and the new MSC/VLR element 134, are possible. An exemplary implementation of the GMSC+new MSC/VLR 130, within the context of the call flow 300 of FIG. 3, is presented in FIG. 5.

Figure 5:
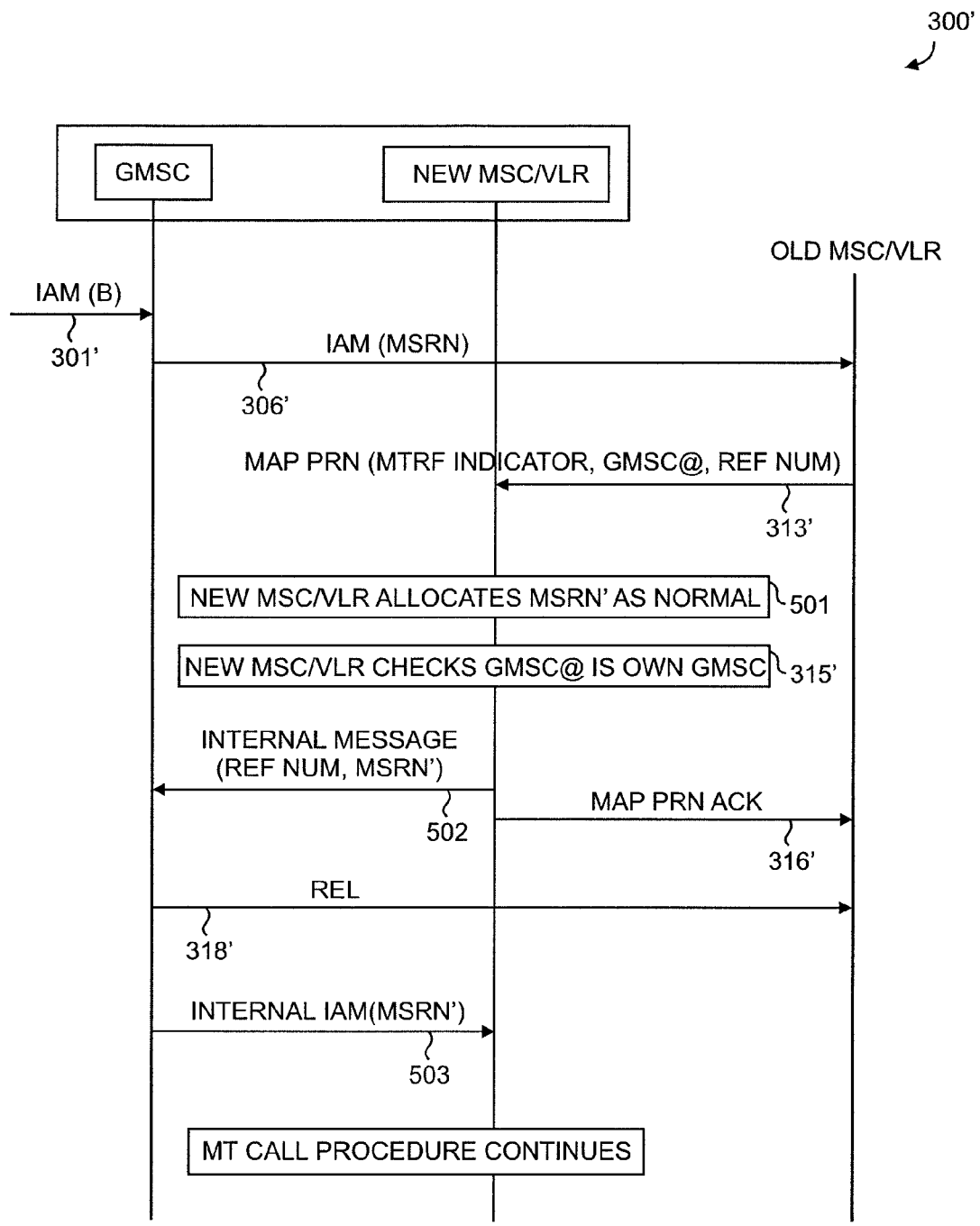
FIG. 5 depicts an exemplary embodiment of a call flow in which call loop avoidance is supported using an exemplary implementation of a GMSC+new MSC/VLR.

FIG. 5 depicts an exemplary embodiment of a call flow in which call loop avoidance is supported using an exemplary implementation of a GMSC+new MSC/VLR. As depicted in FIG. 5, the call flow is indicated as being call flow 300', which is indicative that it represents a version of call flow 300 of FIG. 3 in which the GMSC+new MSC/VLR 130 is implemented in a particular manner (illustratively, using an exemplary distribution of functions of the GMSC+new MSC/VLR 130 across the GMSC element 132 and the new MSC/VLR element 134 of the GMSC+new MSC/VLR 130). It will be appreciated that only a portion of the steps of call flow 300 are depicted in conjunction with call flow 300' of FIG. 5 (namely, any step 3xx of call flow 300 not having a corresponding step 3xx' presented as part of call flow 300' of FIG. 5 has been omitted from call flow 300' of FIG. 5 for purposes of clarity in depicting and describing an exemplary implementation of a GMSC+new MSC/VLR). It will be appreciated that, although primarily depicted and described as being performed serially, at least a portion of the steps of method 300' may be performed contemporaneously or in a different order than depicted in FIG. 5.

At step 301', the GMSC element 132 of GMSC+new MSC/VLR 130 receives an Initial Address Message (IAM). This is an implementation of step 301 of FIG. 3 in which the IAM message is received by the GMSC element 132. It is noted that steps 302-305 are omitted for purposes of clarity.

At step 306', the GMSC element 132 of GMSC+new MSC/VLR 130 sends an IAM message to the old MSC/VLR 120. The IAM message includes the MSRN of the MD 110 which is determined by the GMSC element 132 of the GMSC+new MSC/VLR 130 from the MAP SRI ACK message. This is an implementation of step 306 of FIG. 3 in which the IAM message is sent by the GMSC element 132. It is noted that steps 307-312 are omitted for purposes of clarity.

At step 313', the old MSC/VLR 120 sends a MAP PRN message to the new MSC/VLR element 134 of the GMSC+new MSC/VLR 130. The MAP PRN message includes an MTRF flag set in a manner for indicating that the MTRF procedure is supported (denoted as MTRF Indicator), the address of the GMSC determined from the MAP PRN message (denoted as GMSC@), the Call Reference Number determined from the MAP PRN message (denoted as Ref Num), and an MTRF Optimal Routing Supported Information Element (denoted as MTRF Optimal Routing Supported). This is an implementation of step 313 of method 300 in which the MAP PRN message is received by the new MSC/VLR element 134. It is noted that step 314 is omitted for purposes of clarity.

At step 501 (a step which, although it may be performed within the context of at least some embodiments of method 300, is not depicted in FIG. 3), the new MSC/VLR element 134 of the GMSC+new MSC/VLR 130 allocates MSRN'.

At step 315', the new MSC/VLR element 134 of the GMSC+new MSC/VLR 130 determines whether the GMSC address received in the MAP PRN message is the same as the GMSC address of the GMSC element 132 of GMSC+new MSC/VLR 130 (i.e., whether the GMSC address received in the MAP PRN message from the old MSC/VLR 120 is its own address). This is an implementation of step 315 of method 300 in which the new MSC/VLR element 134 makes the determination as to whether the GMSC address received in the MAP PRN message is the same as the GMSC address of the GMSC element 132.

At step 502 (a step which, although it may be performed within the context of at least some embodiments of method 300, is not depicted in FIG. 3), the new MSC/VLR element 134 of the GMSC+new MSC/VLR 130 sends an internal message to the GMSC element 132 of GMSC+new MSC/VLR 130. The internal message includes the Call Reference Number received by the new MSC/VLR element 134 from the old MSC/VLR 120 as part of the MAP PRN message and the MSRN' allocated by the new MSC/VLR element 134.

At step 316', the new MSC/VLR element 134 of the GMSC+new MSC/VLR 130 responds to the MAP PRN message by sending a MAP PRN ACK message to the old MSC/VLR 120. The MAP PRN ACK message may or may not include the MSRN' allocated by the new MSC/VLR element 134. The MAP PRN ACK message includes an MTRF Optimal Routing Performed Information Element (denoted as MTRF Optimal Routing Performed). It is noted that, if the MAP PRN ACK message includes the MSRN' and the MTRF Optimal Routing Performed Information Element, the old MSC/VLR 120 ignores the MSRN' based on a determination that the MAP PRN ACK message includes the MTRF Optimal Routing Performed Information Element. This is an implementation of step 316 of method 300 in which the new MSC/VLR element 134 sends the MAP PRN ACK message to the old MSC/VLR 120. It is noted that step 317 is omitted for purposes of clarity.

At step 318', the GMSC element 132 of the GMSC+new MSC/VLR 130 sends a Release message to the old MSC/VLR 120. The old MSC/VLR 120 releases the MD 110 in response to the Release message. This is an implementation of step 318 of method 300 in which the GMSC element 132 sends the Release message to the old MSC/VLR 120. It is noted that steps 319-323 are omitted for purposes of clarity.

At step 503 (a step which, although it may be performed within the context of at least some embodiments of method 300, is not depicted in FIG. 3), the GMSC element 132 of the GMSC+new MSC/VLR 130 sends an Internal IAM message to the new MSC/VLR element 134 of the GMSC+new MSC/VLR 130. The Internal IAM message includes the MSRN' received by the GMSC element 132 of the GMSC+new MSC/VLR 130 from the new MSC/VLR element 134 of the GMSC+new MSC/VLR 130.

As depicted in FIG. 5, the normal MT call procedure follows after step 503. The normal MT call procedure will be understood by one skilled in the art.

It will be appreciated that, although primarily depicted and described with respect to embodiments in which the old MSC/VLR indicates to the GMSC+new MSC/VLR that the old MSC/VLR supports MTRF optimal routing, in at least some cases an old MSC/VLR may not support MTRF optimal routing or may not indicate support for MTRF optimal routing. Thus, in at least some embodiments, the GMSC+new MSC/VLR may be configured to handle the case in which the old MSC/VLR does not support MTRF optimal routing or does not indicate support for MTRF optimal routing. In at least some embodiments, based on a determination by the GMSC+new MSC/VLR that the old MSC/VLR does not support MTRF optimal routing or does not indicate support for MTRF optimal routing, the GMSC+new MSC/VLR may be configured to accept the MT call from the old MSC/VLR even though a call loop may be formed as discussed herein. In at least some embodiments, based on a determination by the GMSC+new MSC/VLR that the old MSC/VLR does not support MTRF optimal routing or does not indicate support for MTRF optimal routing, the GMSC+new MSC/VLR may be configured to (1) send a Release message to the old MSC/VLR while (2) delay sending of the MAP PRN ACK message, to the old MSC/VLR responsive to the MAP PRN message received from the old MSC/VLR, for a length of time. The GMSC+new MSC/VLR may be configured to delay sending of the MAP PRN ACK message to the old MSC/VLR for a length of time expected to be sufficient to enable the GMSC for the UE to propagate a Release message to the old MSC/VLR and to receive an associated Release Response message from the old MSC/VLR. The delay of the sending of the MAP PRN ACK message from the GMSC+new MSC/VLR to the old MSC/VLR may be performed at least because crossing of Release messages between the GMSC and the old MSC/VLR may not be desirable (although it will be appreciated that, in at least some situations, such crossing of Release messages may be necessary, desirable, or at least acceptable). Additionally, in at least some embodiments, the old MSC/VLR shall not initiate a Release procedure toward the GMSC (as this would lead to a teardown of the call) or initiate call forwarding (although, again, there may be certain situations in which such actions may be necessary, desirable, or at least acceptable). These and other embodiments may be used to provide backwards compatibility for cases in which an old MSC/VLR may not support MTRF. An exemplary embodiment is depicted and described with respect to FIG. 6.

Figure 6:
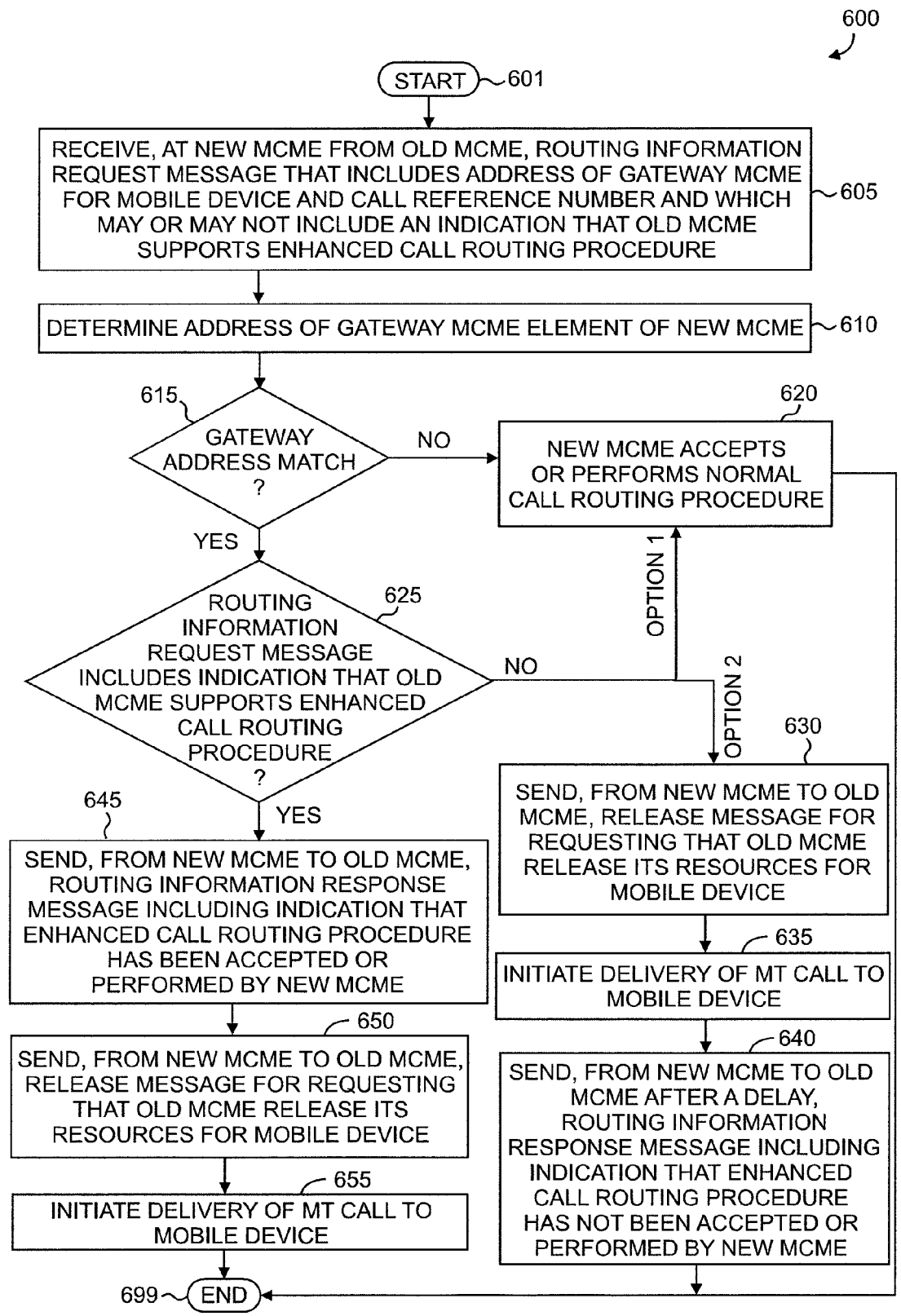
FIG. 6 depicts one embodiment of a method for preventing formation of a call loop associated with handling of a mobile terminated call in parallel with a location update for a mobile device in a wireless communication network.

FIG. 6 depicts one embodiment of a method for preventing formation of a call loop associated with handling of a mobile terminated call in parallel with a location update for a mobile device in a wireless communication network. It will be appreciated that method 600 of FIG. 6 may be performed by a new mobility/call management entity (e.g., a GMSC+new MSC/VLR) when an MT call intended for the mobile device is received while the mobile device is moving from an old mobility/call management entity (e.g., an old MSC/VLR) to the new mobility/call management entity. The old mobility/ call management entity may be referred to as the old MCME and the new mobility/call management entity may be referred to as the new MCME. It will be appreciated that, although primarily depicted and described as being performed serially, at least a portion of the steps of method 600 may be performed contemporaneously or in a different order than depicted in FIG. 6.

At step 601, method 600 begins.

At step 605, the new MCME receives a routing information request message from the old MCME. The routing information request message is adapted to request retrieval of routing information for a call routing procedure (which may be a normal call routing procedure or an enhanced version of a normal call routing procedure) to be used for delivering the MT call to the mobile device while the mobile device is in the process of moving from the old MCME to the new MCME. The enhanced call routing procedure is an enhanced version of the call routing procedure associated with the routing information request message, where the enhanced call routing procedure is configured to prevent formation of a call loop between the old MCME and the new MCME during delivery of an MT call to the mobile device. For example, the normal call routing procedure may be the MTRF procedure (or other suitable call routing procedure) and the enhanced call routing procedure may be an enhanced version of the MTRF procedure (or other suitable call routing procedure). The routing information request message includes an address of the gateway MCME (e.g., GMSC) for the mobile device and a call reference number for the MT call, and may or may not include an indication that the old MCME supports an enhanced call routing procedure. The movement of the mobile device from the old MCME to the new MCME may be controlled using a location update procedure (which, in at least some situations, also may be referred to as a registration procedure, such as where the mobile device is reregistering with the new MCME).

At step 610, the new MCME determines the address of the gateway MCME element of the new MCME. This may be a determination of the address of the new MCME (e.g., the gateway MCME is a function of the new MCME).

At step 615, new MCME determines whether the address of the gateway MCME for the mobile device (from the routing information request message) and the address of the gateway MCME element of the new MCME match. If the addresses do not match (e.g., the case in which the gateway MCME and the new MCME are different network nodes), method 600 proceeds to step 620. If the addresses do match, method 600 proceeds to step 625.

At step 620, the new MCME accepts or performs the call routing procedure. It will be appreciated that the call routing procedure is the normal, non-enhanced call routing procedure. For example, the call routing procedure may be the normal MTRF procedure. From step 620, method 600 proceeds to step 699, where method 600 ends.

At step 625, the new MCME determines whether the routing information request message includes an indication that the old MCME supports the enhanced call routing procedure. If the routing information request message does not include an indication that the old MCME supports the enhanced call routing procedure, method 600 either proceeds to step 620 (denoted as Option 1) or to step 630 (denoted as Option 2), depending upon implementation. If the routing information request message includes an indication that the old MCME supports the enhanced call routing procedure, method 600 proceeds to step 645.

At step 630, the new MCME sends a release message to the old MCME for requesting that the old MCME release its resources for the mobile device. At step 635, the new MCME initiates direct delivery of the MT call to the mobile device. The direct delivery of the MT call to the mobile device is a delivery of the MT call from the new MCME to the mobile device, rather than delivery of the MT call by the new MCME to the mobile device via the old MCME. At step 640, the new MCME sends a negative routing information response (that may take the form of, e.g., an abort message) to the old MCME after a delay (since step 635). The negative routing information response message does not contain the indication that the new MCME has accepted or performed the enhanced call routing procedure (although the new MCME has performed the enhanced call routing procedure) since the old MCME cannot understand such an indication if the old MCME does not support the enhanced call routing procedure. From step 640, method 600 proceeds to step 699, where method 600 ends.

At step 645, the new MCME sends a positive routing information response message to the old MCME in response to the routing information request message. The positive routing information response message includes an indication that the new MCME has accepted or performed the enhanced call routing procedure. At step 650, the new MCME sends a release message to the old MCME for requesting that the old MCME release its resources for the mobile device. At step 655, the new MCME initiates direct delivery of the MT call to the mobile device. Again, the direct delivery of the MT call to the mobile device is a delivery of the MT call from the new MCME to the mobile device, rather than delivery of the MT call by the new MCME to the mobile device via the old MCME. From step 655, method 600 proceeds to step 699, where method 600 ends.

At step 699, method 600 ends.

It will be appreciated that, although primarily presented with respect to embodiments in which the determination as to whether or not a call loop is expected to form during delivery of the MT call to the mobile device is based on the gateway MCME address information (namely, a determination as to whether the address of the gateway MCME for the mobile device from the routing information request message and the address of the gateway MCME element of the new MCME match, as described in step 615 of method 600), the determination as to whether or not a call loop is expected to form during delivery of the MT call to the mobile device may be based on other types of information and, thus, may be considered to be based on a determination as to whether the indication of the gateway MCME for the MD from the routing information request message (e.g., the address of the gateway MCME or some other suitable identifier of the gateway MCME) identifies the new MCME.

Figure 7:
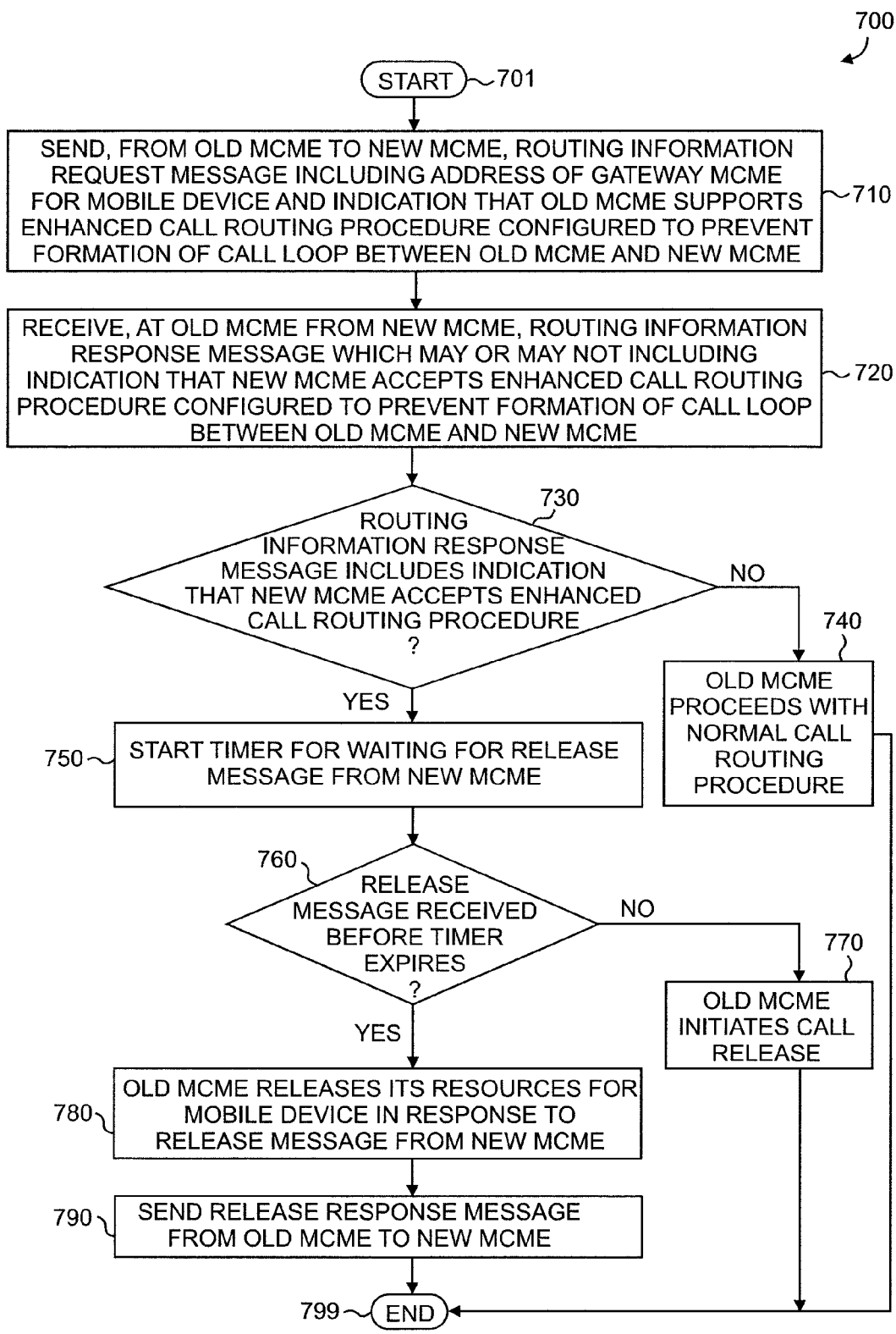
FIG. 7 depicts one embodiment of a method for preventing formation of a call loop associated with handling of a mobile terminated call in parallel with a location update for a mobile device in a wireless communication network.

FIG. 7 depicts one embodiment of a method for preventing formation of a call loop associated with handling of a mobile terminated call in parallel with a location update for a mobile device in a wireless communication network. It will be appreciated that method 700 of FIG. 7 may be performed by an old mobility/call management entity (e.g., an old MSC/VLR) when an MT call intended for the mobile device is received while the mobile device is moving from the old mobility/call management entity (e.g., an old MSC/VLR) to a new mobility/call management entity (e.g., a GMSC+new MSC/VLR). The old mobility/call management entity may be referred to as the old MCME and the new mobility/call management entity may be referred to as the new MCME. It will be appreciated that, although primarily depicted and described as being performed serially, at least a portion of the steps of method 700 may be performed contemporaneously or in a different order than depicted in FIG. 7.

At step 701, method 700 begins.

At step 710, the old MCME sends a routing information request message to the new MCME. The routing information request message includes an address of a gateway MCME for the mobile device, a call reference number for the MT call, and an indication that the old MCME supports an enhanced call routing procedure for routing the MT call from the old MCME to the new MCME when the mobile device is registered to the new MCME from the old MCME, where the enhanced call routing procedure is configured to prevent formation of a call loop between the old MCME and the new MCME during delivery of an MT call to the mobile device. For example, the enhanced call routing procedure may be an enhanced version of the normal MTRF procedure.

At step 720, the old MCME receives a routing information response message from the new MCME. The routing information response message may or may not include an indication that the new MCME has accepted or performed the enhanced call routing procedure indicated by the old MCME in the routing information request message. The routing information response message may or may not include an MSRN.

At step 730, the old MCME determines whether the routing information response message includes an indication that the new MCME has accepted or performed the enhanced call routing procedure. If the routing information response message does not include an indication that the new MCME has accepted or performed the enhanced call routing procedure, method 700 proceeds to step 740. If the routing information response message includes an indication that the new MCME has accepted or performed the enhanced call routing procedure, method 700 proceeds to step 750.

At step 740, the old MCME proceeds with the normal call routing procedure. From step 740, method 700 proceeds to step 799, where method 700 ends.

At step 750, the old MCME starts a timer for waiting for a release message from the new MCME.

At step 760, the old MCME determines whether the release message is received from the new MCME before the timer expires. The old MCME monitors the timer and monitors for receipt of the release message from the new MCME. If the release message is not received from the new MCME before the timer expires, method 700 proceeds to step 770. If the release message is received from the new MCME before the timer expires, method 700 proceeds to step 780.

At step 770, the old MCME initiates the call release. From step 770, method 700 proceeds to step 799, where method 700 ends.

At step 780, the old MCME releases its resources for the mobile device in response to the release message from the new MCME.

At step 790, the old MCME sends a release response message to the new MCME.

At step 799, method 700 ends.

It will be appreciated that, although primarily depicted and described herein with respect to embodiments in which the call loop avoidance capability is provided within the context of a communication system using specific types of protocols (e.g., the ISDN User Part (ISUP) protocol and the Bearer-Independent Call Control (BICC) protocol) supporting specific types of messages (e.g., IAM, Release message, or the like), in at least some embodiments the call loop avoidance capability may be provided within the context of a communication system using one or more other types of protocols (e.g., Session Initiation Protocol (SIP) or the like) supporting other types of messages. Thus, it will be appreciated that references herein to protocol-specific messages may be read more generally as general messages that are configured to provide the same or similar functions as the protocol-specific messages.

It will be appreciated that, although primarily presented herein with respect to embodiments in which the call loop avoidance capability is provided within the context of an MTRF procedure that is supported by a 3GPP wireless communication system, in at least some embodiments the call loop avoidance capability may be provided within the context of an MTRF procedure that is supported by one or more other types of wireless communication systems. It will be appreciated that, although primarily presented herein with respect to embodiments in which call loop avoidance capability is provided within the context of an MTRF procedure that is supported by a wireless communication system, in at least some embodiments the call loop avoidance capability may be provided independent of an MTRF procedure that is supported by one or more other types of wireless systems. In at least some embodiments, various features of the call loop avoidance capability may be adapted to prevent formation of a call loop when a mobile device moves across mobility management entities during delivery of a mobile terminated call to the mobile device. Thus, references herein to an old MSC/VLR may be read more generally as an old mobility/call management entity serving the mobile device and, similarly, references herein to a GMSC+new MSC/VLR may be read more generally as a new mobility/call management entity serving the mobile device.

As described herein, avoidance of a call loop between the old MSC/VLR and the new MSC/VLR when the mobile device moves from the old MSC/VLR to the new MSC/VLR during delivery of the MT call may result in various advantages. For example, avoidance of the call loop between the old MSC and the new MSC may save network resources, such as one or more of routing number resources (e.g. MSRNs), transport resources (e.g., IP bandwidth for a Adaptive Multi-Rate Wideband (AMR-WB) audio call in both directions), signaling resources between the old MSC/VLR and the new MSC/VLR, processing resources in the old MSC/VLR and the new MSC/VLR, or the like, as well as various combinations thereof. For example, avoidance of the call loop between the old MSC and the new MSC may reduce operator costs. For example, avoidance of the call loop between the old MSC and the new MSC may reduce or eliminate the inter-PLMN/international charging (e.g., extra inter-operator fees when the old MSC/VLR and the new MSC/VLR are associated with different operators). For example, avoidance of the call loop between the old MSC and the new MSC may reduce or eliminate extra latency and call setup delay which would otherwise might result (especially if the old MSC/VLR and the new MSC/VLR are located in different regions (e.g., different countries, different geographic regions, or the like). For example, avoidance of the call loop between the old MSC and the new MSC may reduce or eliminate unnecessary multiple lawful interceptions on one or more of the elements associated with delivery of the MT call when the mobile device moves from the old MSC/VLR to the new MSC/VLR during delivery of the MT call (e.g., the GMSC, the old MSC/VLR, the new MSC/VLR, or the like). For example, avoidance of the call loop between the old MSC and the new MSC may reduce or eliminate operator cost or may increase or maximize network capacity. It will be appreciated that at least some of the foregoing advantages or various other advantages may be realized when embodiments of the call loop avoidance capability are provided within other contexts (e.g., similar wireless communication networks employing other protocols, other types of wireless communication networks, or the like, as well as various combinations thereof).

Figure 8:
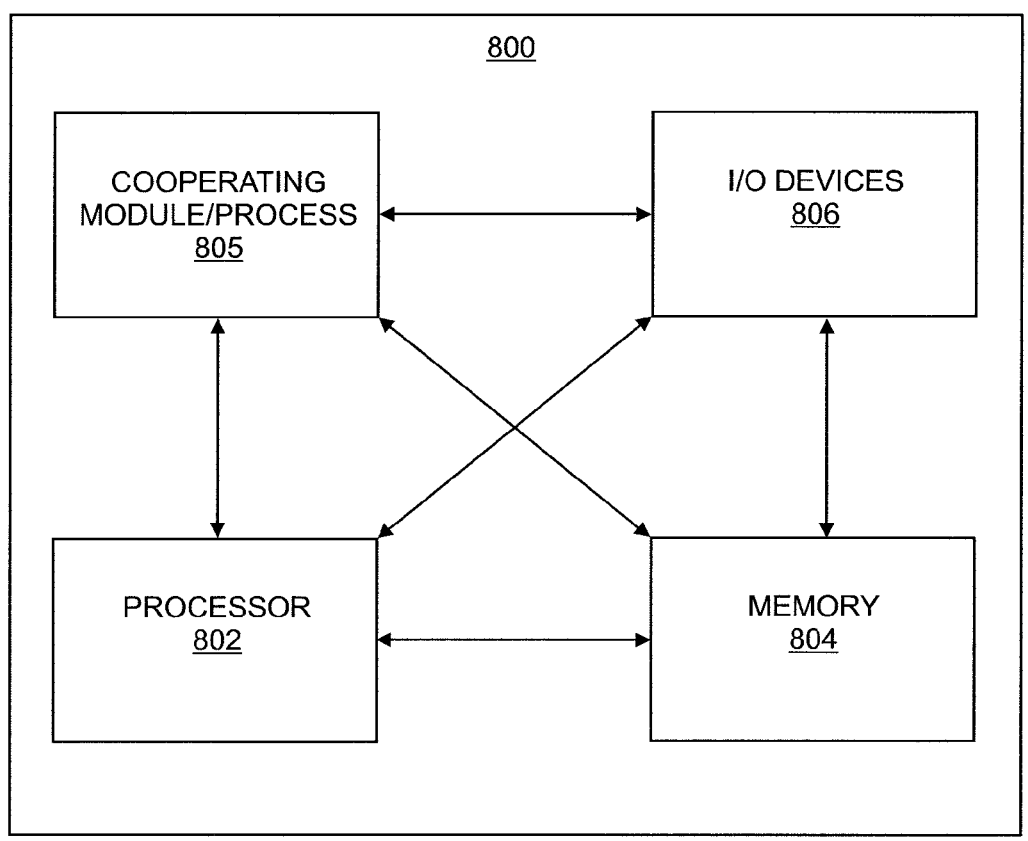
FIG. 8 depicts a high-level block diagram of a computer suitable for use in performing functions described herein.

FIG. 8 depicts a high-level block diagram of a computer suitable for use in performing functions described herein.

The computer 800 includes a processor 802 (e.g., a central processing unit (CPU) or other suitable processor(s)) and a memory 804 (e.g., random access memory (RAM), read only memory (ROM), and the like).

The computer 800 also may include a cooperating module/process 805. The cooperating process 805 can be loaded into memory 804 and executed by the processor 802 to implement functions as discussed herein and, thus, cooperating process 805 (including associated data structures) can be stored on a computer readable storage medium, e.g., RAM memory, magnetic or optical drive or diskette, and the like.

The computer 800 also may include one or more input/output devices 806 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 800 depicted in FIG. 8 provides a general architecture and functionality suitable for implementing functional elements described herein or portions of functional elements described herein. For example, computer 800 provides a general architecture and functionality suitable for implementing one or more of MD 110, a portion of MD 110, old MSC/VLR 120, a portion of old MSC/VLR 120, GMSC+new MSC/VLR 130, a portion of GMSC+new MSC/VLR 130, HLR 140, a portion of HLR 140, or the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or" unless otherwise indicated (e.g., via use of "or else" or "or in the alternative").

It will be appreciated that, while the foregoing is directed to various embodiments of features present herein, other and further embodiments may be devised without departing from the basic scope thereof.

What is claimed is:

1. A method for preventing a call loop for a mobile terminated (MT) call to a mobile device (MD), the method comprising:
using a processor and a memory for:
receiving, at a first mobility and call management entity (MCME) from a second MCME, a routing information request message associated with delivery of the MT call to the MD, the routing information request message comprising an indication of a gateway MCME for the MD; and
determining, based on the indication of the gateway MCME for the MD, whether a call loop is expected to form between the first MCME and the second MCME during delivery of the MT call to the MD while the MD is moving from the second MCME to the first MCME using a location update procedure.

2. The method of claim 1, further comprising:
receiving a message indicative of movement of the MD from an area served by the second MCME to an area served by the first MCME.

3. The method of claim 1, further comprising:
receiving a message indicative of movement of the MD from the second MCME to the first MCME when the MD reselects a different Radio Access Technology during delivery of the MT call.

4. The method of claim 3, wherein the message indicative of movement of the MD from the second MCME to the first MCME when the MD reselects a different Radio Access Technology during delivery of the MT call is indicative that the MD moves from the second MCME to the first MCME when the MD camps over an Evolved Universal Terrestrial Radio Access Network (E-UTRAN) during delivery of the MT call and reselects a UTRAN or a Global System for Mobile (GSM) EDGE Radio Access Network (GERAN) to proceed with establishment of the MT call.

5. The method of claim 1, wherein determining whether the call loop is expected to form between the first MCME and the second MCME during delivery of the MT call to the MD comprises:
determining whether the indication of the gateway MCME for the MD from the routing information request message identifies the first MCME.

6. The method of claim 5, wherein the indication of the gateway MCME for the MD comprises a gateway MCME address for the MD, wherein the first MCME has a gateway MCME address associated therewith, wherein determining whether the indication of the gateway MCME for the MD from the routing information request message identifies the first MCME comprises:
comparing the gateway MCME address for the MD from the routing information request message and the gateway MCME address associated with the first MCME.

7. The method of claim 6, further comprising:
determining that the call loop is expected to form between the first MCME and the second MCME during delivery of the MT call to the MD based on a determination that the gateway MCME address for the MD from the routing information request message and the gateway MCME address associated with the first MCME match.

8. The method of claim 5, further comprising:
determining that the call loop is expected to form between the first MCME and the second MCME during delivery of the MT call to the MD based on a determination that the indication of the gateway MCME for the MD from the routing information request message identifies the first MCME.

9. The method of claim 5, further comprising:
determining that the call loop is not expected to form between the first MCME and the second MCME during delivery of the MT call to the MD based on a determination that the indication of the gateway MCME for the MD from the routing information request message does not identify the first MCME.

10. The method of claim 1, further comprising:
based on a determination that the call loop is expected to form between the first MCME and the second MCME during delivery of the MT call to the MD:
propagating a routing information response message from the first MCME toward the second MCME.

11. The method of claim 1, further comprising:
based on a determination that the call loop is expected to form between the first MCME and the second MCME during delivery of the MT call to the MD:
propagating, from the first MCME toward the second MCME, a release message for instructing the second MCME to release resources of the second MCME for the MD.

12. The method of claim 1, further comprising:
based on a determination that the call loop is expected to form between the first MCME and the second MCME during delivery of the MT call to the MD, initiating delivery of the MT call directly from the first MCME to the MD.

13. The method of claim 1, further comprising:
based on a determination that the call loop is expected to form between the first MCME and the second MCME during delivery of the MT call to the MD, determining whether to use an enhanced call routing procedure to prevent formation of the call loop that is expected to form between the first MCME and the second MCME during delivery of the MT call to the MD.

14. The method of claim 13, wherein determining whether to use the enhanced call routing procedure to prevent formation of the call loop that is expected to form between the first MCME and the second MCME during delivery of the MT call to the MD comprises:
determining whether the routing information request message includes an indication that the second MCME supports the enhanced call routing procedure.

15. The method of claim 13, further comprising:
based on a determination to use the enhanced call routing procedure:
propagating, from the first MCME toward the second MCME, a routing information response message indicative that the enhanced call routing procedure is accepted or performed by the first MCME.

16. The method of claim 13, further comprising:
based on a determination to use the enhanced call routing procedure:
propagating, from the first MCME toward the second MCME, a release message for instructing the second MCME to release resources of the second MCME for the MD.

17. The method of claim 13, further comprising:
based on a determination to use the enhanced call routing procedure, initiating delivery of the MT call directly from the first MCME to the MD.

18. The method of claim 13, further comprising:
based on a determination not to use the enhanced call routing procedure, performing a normal call routing procedure for delivery of the MT call to the MD by the first MCME via the second MCME.

19. The method of claim 13, further comprising:
based on a determination to use the enhanced call routing procedure when the routing information request message from the second MCME does not include an indication that the second MCME supports the enhanced call routing procedure:
propagating, from the first MCME toward the second MCME, a release message for instructing the second MCME to release resources of the second MCME for the MD;
initiating delivery of the MT call directly from the first MCME to the MD; and
propagating, from the first MCME toward the second MCME, a negative routing information response which does not indicate that the enhanced call routing procedure is accepted or performed by the first MCME.

20. The method of claim 1, wherein the first MCME comprises a first Mobile Switching Center (MSC)/Visiting Location Register (VLR) element and the second MCME comprises a second MSC/VLR element.

21. The method of claim 20, wherein the first MSC/VLR element receives a Location Update request from the MD during delivery of the MT call by the second MSC/VLR, and the first MSC/VLR element also supports a Gateway MSC (GMSC) function for the MT call.

22. The method of claim 21, further comprising:
initiating delivery of the MT call to the MD using an enhanced call routing procedure configured to prevent formation of the call loop between the first MSC/VLR and the second MSC/VLR during delivery of the MT call to the MD, wherein the enhanced call routing procedure comprises a version of a Mobile Termination Roaming Forwarding (MTRF) procedure.

23. A computer-readable storage medium storing instructions which, when executed by a computer, cause the computer to perform a method for preventing a call loop for a mobile terminated (MT) call to a mobile device (MD), the method comprising:
receiving, at a first mobility and call management entity (MCME) from a second MCME, a routing information request message associated with delivery of the MT call to the MD, the routing information request message comprising an indication of a gateway MCME for the MD; and
determining, based on the indication of the gateway MCME for the MD, whether a call loop is expected to form between the first MCME and the second MCME during delivery of the MT call to the MD while the MD is moving from the second MCME to the first MCME using a location update procedure.

24. An apparatus for preventing a call loop for a mobile terminated (MT) call to a mobile device (MD), the apparatus comprising:
a processor and a memory communicatively connected to the processor, the processor configured to:
receive, from a mobility and call management entity (MCME), a routing information request message associated with delivery of the MT call to the MD, the routing information request message comprising an indication of a gateway MCME for the MD; and
determine, based on the indication of the gateway MCME for the MD, whether a call loop is expected to form between with the MCME during delivery of the MT call to the MD while the MD is moving from the second MCME to the first MCME using a location update procedure.

* * * * *